United States Patent
Pan et al.

(10) Patent No.: US 11,948,388 B2
(45) Date of Patent: Apr. 2, 2024

(54) METHOD AND APPARATUS FOR USER RECOGNITION USING 2D EMG SPECTROGRAM IMAGE

(71) Applicant: Industry-Academic Cooperation Foundation, Chosun University, Gwangju (KR)

(72) Inventors: Sung Bum Pan, Gwangju (KR); Jae Myung Kim, Gwangju (KR); Gyu Ho Choi, Gwangju (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 364 days.

(21) Appl. No.: 17/382,665

(22) Filed: Jul. 22, 2021

(65) Prior Publication Data
US 2022/0027617 A1   Jan. 27, 2022

(30) Foreign Application Priority Data
Jul. 22, 2020  (KR) .................. 10-2020-0090896

(51) Int. Cl.
*G06V 40/10* (2022.01)

(52) U.S. Cl.
CPC .......... *G06V 40/10* (2022.01); *G06F 2218/02* (2023.01); *G06F 2218/12* (2023.01)

(58) Field of Classification Search
CPC ................ G06V 40/10; G06F 2218/12; G06F 2218/02
See application file for complete search history.

(56) References Cited

U.S. PATENT DOCUMENTS

| | | | | |
|---|---|---|---|---|
| 8,280,503 B2* | 10/2012 | Linderman | .......... | A61B 5/7264 |
| | | | | 600/595 |
| 9,155,487 B2* | 10/2015 | Linderman | .......... | A61B 5/4082 |
| 9,585,581 B1* | 3/2017 | Mullins | .................. | A61B 5/375 |
| 9,795,339 B2* | 10/2017 | Kim | ...................... | A61B 5/274 |
| 9,880,632 B2* | 1/2018 | Ataee | .................. | G06F 18/2415 |
| 10,638,943 B2* | 5/2020 | Kim | ...................... | B62J 45/422 |
| 10,684,692 B2* | 6/2020 | Aleem | .................... | G06F 3/017 |
| 10,905,383 B2* | 2/2021 | Barachant | ............ | A61B 5/6831 |
| 11,436,308 B2* | 9/2022 | Kim | ........................ | G06F 3/017 |

(Continued)

FOREIGN PATENT DOCUMENTS

KR   10-2012-0018733 A   3/2012

OTHER PUBLICATIONS

He et al., Feb. 2020, "Biometric From Surface Electromyogram (sEMG): Feasibility of User Verification and Identification Based on Gesture Recognition". (pp. 1-10) (Year: 2020).*

(Continued)

*Primary Examiner* — Manav Seth
(74) *Attorney, Agent, or Firm* — Studebaker & Brackett PC (57) ABSTRACT

The present disclosure relates to a user recognition method and a user recognition apparatus using a two-dimensional (2D) electromyogram (EMG) spectrogram image. The user recognition method using a 2D EMG spectrogram image may include (a) acquiring a one-dimensional EMG signal for a user, (b) converting the acquired one-dimensional EMG signal to a 2D EMG spectrogram image including a temporal feature and a frequency feature, and (c) recognizing the user based on the 2D EMG spectrogram image.

8 Claims, 6 Drawing Sheets

(56) References Cited

U.S. PATENT DOCUMENTS

| | | | |
|---|---|---|---|
| 11,464,445 B2* | 10/2022 | Lee | A61B 5/7267 |
| 11,539,657 B2* | 12/2022 | Rapaport | H04L 12/1818 |
| 11,721,127 B2* | 8/2023 | Kim | G06V 40/1318 |
| | | | 382/124 |
| 2015/0216475 A1* | 8/2015 | Luna | A61B 5/7278 |
| | | | 600/301 |
| 2019/0025919 A1* | 1/2019 | Tadi | A61B 5/1114 |
| 2021/0045676 A1* | 2/2021 | Lee | A61B 5/4815 |
| 2021/0334567 A1* | 10/2021 | Tasar | G06V 40/10 |

OTHER PUBLICATIONS

Lu et al., 2019. IEEE Publication, "An EMG-Based Personal Identification Method Using Continuous Wavelet Transform and Convolutional Neural Networks" (marked pp. 1-4). (Year: 2019).*

Kim, Sang-Ho et al., "Human Identification using EMG Signal based Artificial Neural Network", Journal of The Institute of Electronics and Information Engineers, vol. 53, No. 4, Apr. 25, 2016, pp. 142-148.

Moon, D.J et al., "A study on extract in gait pattern characteristic using a tilt sensor and EMG", Journal of rehabilitation welfare engineering & assistive technology, vol. 7, No. 2, Dec. 31, 2013, pp. 75-84.

Kang, Byung-Jong et al., "A Study on the Measuring EMG Signal Using Two-Dimensional images of the Fatigue analysis", Proceedings of the KAIS Fall Conference, 2009.12a, Dec. 4, 2009, pp. 1010-1013, The Korea Academia-Industrial cooperation Society.

An Office Action mailed by the Korean Intellectual Property Office dated Jan. 20, 2022, which corresponds to Korean Patent Application No. 10-2020-0090896 and is related to U.S. Appl. No. 17/382,665.

Decision of Rejection mailed by the Korean Intellectual Property Office dated Aug. 19, 2022, which corresponds to Korean Patent Application No. 10-2020-0090896 and is related to U.S. Appl. No. 17/382,665.

* cited by examiner

METHOD AND APPARATUS FOR USER RECOGNITION USING 2D EMG SPECTROGRAM IMAGE

CROSS-REFERENCE TO RELATED APPLICATION

This application claims priority to and the benefit of Korean Patent Application No. 10-2020-0090896, filed on Jul. 22, 2020, the disclosure of which is incorporated herein by reference in its entirety.

BACKGROUND

1. Field of the Invention

The present disclosure relates to a user recognition method and a user recognition apparatus, and more specifically, to a user recognition method and a user recognition apparatus using a two-dimensional (2D) electromyogram (EMG) spectrogram image.

2. Discussion of Related Art

Fingerprint and iris information was conventionally used for user identification as biometric signals, and recently, an electrocardiogram (ECG) and an electroencephalogram (EEG) based on user convenience and security have been used.

Specifically, since an ECG signal has individual characteristics due to electrophysiological factors of a heart, and a position, a size, and the physical condition of the heart, it is difficult to forge and thus interest is increasing.

It is possible to receive the same service from a conventional user device through user verification using a personal electrocardiogram.

The above serves to act as a barrier and protect the personal information in the user device from the outside. However, although research on individual identification using these electrocardiogram signals is in progress, the development of a specific method for this is insufficient.

SUMMARY OF THE INVENTION

The present disclosure is directed to providing a user recognition method and a user recognition apparatus using a two-dimensional (2D) electromyogram (EMG) spectrogram image.

Further, the present disclosure is directed to providing a user recognition method and a user recognition apparatus using the 2D EMG spectrogram image corresponding to an adjusted window length of Fourier transform conversion.

Purposes of the present disclosure are not limited to the above-mentioned purposes, and other purposes which are not mentioned can be apparently understood from the following description.

A user recognition method using a 2D EMG spectrogram image according to an embodiment of the present disclosure includes: (a) acquiring a one-dimensional EMG signal for a user; (b) converting the acquired one-dimensional EMG signal to a 2D EMG spectrogram image including a temporal feature and a frequency feature; and (c) recognizing the user based on the 2D EMG spectrogram image.

In the embodiment, the operation (b) may include: dividing the one-dimensional EMG signal into repetitive cycles for one motion of the user; separating the divided one-dimensional EMG signal for each of at least one muscle used for one motion of the user; and combining the one-dimensional EMG signal separated for each of the at least one muscle in a time domain.

In the embodiment, the operation (b) may include converting the one-dimensional EMG signal combined in the time domain to the 2D EMG spectrogram image.

In the embodiment, the converting operation may include: applying a Fourier transform to the one-dimensional EMG signal combined in the time domain to convert the one-dimensional EMG signal to the 2D EMG spectrogram image; and adjusting a window length of the Fourier transform to generate the 2D EMG spectrogram image corresponding to the window length.

In the embodiment, the operation (c) may include applying the 2D EMG spectrogram image corresponding to the window length to a deep learning network to recognize the user.

A user recognition apparatus using a 2D EMG spectrogram image according to an embodiment of the present disclosure includes: an acquisition part configured to acquire a one-dimensional EMG signal for a user; and a controller configured to convert the acquired one-dimensional EMG signal to a 2D EMG spectrogram image including a temporal feature and a frequency feature, and recognize the user based on the 2D EMG spectrogram image.

In the embodiment, the controller may divide the one-dimensional EMG signal into repetitive cycles for one motion of the user, separate the divided one-dimensional EMG signal for each of at least one muscle used for one motion of the user, and combine the one-dimensional EMG signal separated for each of the at least one muscle in a time domain.

In the embodiment, the controller may convert the one-dimensional EMG signal combined in the time domain to the 2D EMG spectrogram image.

In the embodiment, the controller may apply a Fourier transform to the one-dimensional EMG signal combined in the time domain to convert the one-dimensional EMG signal to the 2D EMG spectrogram image, and adjust a window length of the Fourier transform to generate the 2D EMG spectrogram image corresponding to the window length.

In the embodiment, the controller may apply the 2D EMG spectrogram image corresponding to the window length to a deep learning network to recognize the user.

Specific details for achieving the above-described purposes will be apparent with reference to the embodiments which will be described below in detail by the accompanying drawings.

However, the present disclosure is not limited to the embodiments which will be described below, but may be configured in various different forms, and is provided to inform the scope of the disclosure to those skilled in the art (hereinafter, referred to as "ordinary expert").

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Since the present disclosure may be variously modified, and may have various embodiments, specific embodiments will be exemplified in the drawings, and described in detail.

Various features of the disclosure disclosed in the claims may be better understood in consideration of the drawings and detailed descriptions. An apparatus, a method, a manufacturing method, and various embodiments disclosed in the specification are provided for the purpose of illustration. Disclosed structural and functional features are provided so that those skilled in the art may specifically perform the various embodiments, and are not provided to limit the scope of the disclosure. Disclosed terms and sentences provided so that descriptions of various features of the disclosure are easily understood, and are not intended to limit the scope of the disclosure.

In the description of the present disclosure, when is determined that the detailed descriptions of a related known technology may unnecessarily obscure the principle of the present disclosure, the detailed description thereof will be omitted.

Hereinafter, a user recognition method and a user recognition apparatus using a two-dimensional (2D) electromyogram (EMG) spectrogram image according to one embodiment of the present disclosure will be described.

Figure 1:
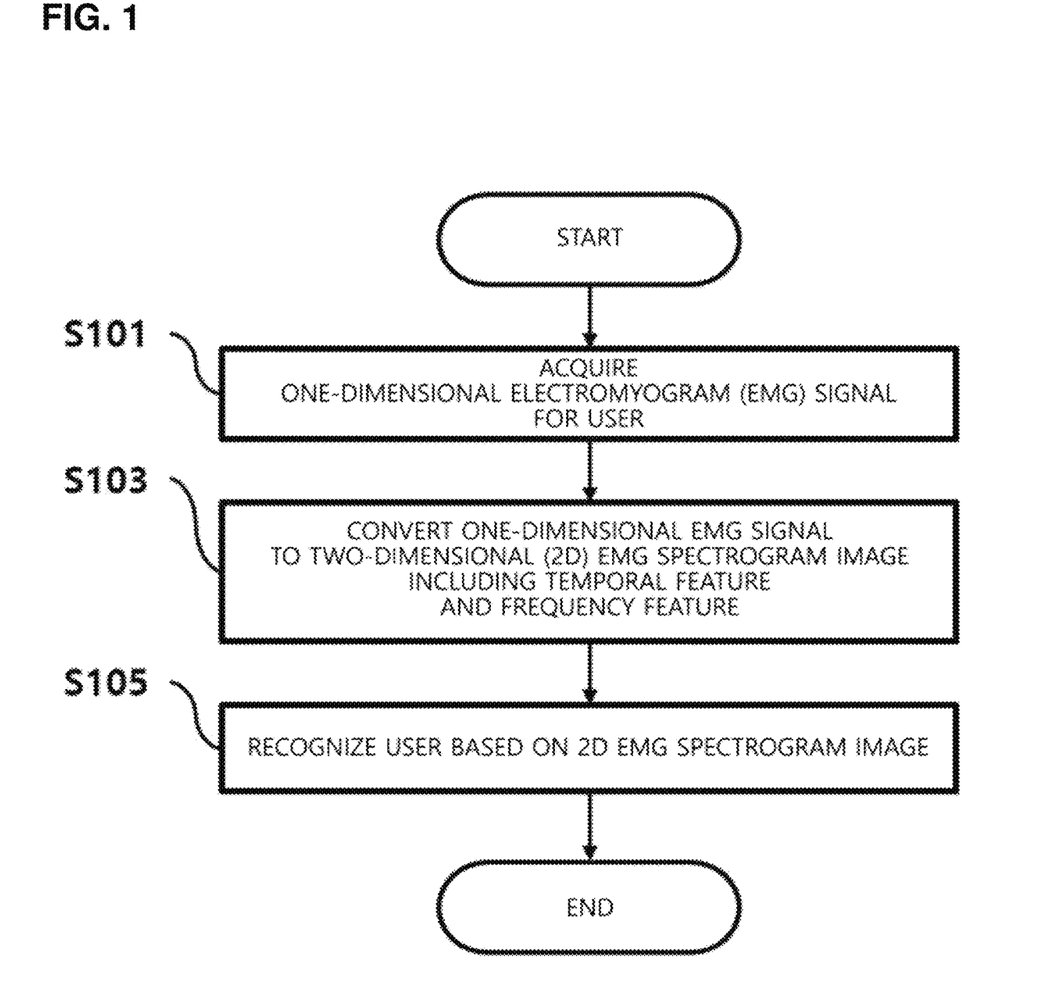
FIG. 1 is a view illustrating a user recognition method using a two-dimensional (2D) electromyogram (EMG) spectrogram image according to one embodiment of the present disclosure.

FIG. 1 is a view illustrating a user recognition method using a 2D EMG spectrogram image according to one embodiment of the present disclosure.

Referring to FIG. 1, operation S101 is an operation of acquiring a one-dimensional EMG signal for a user.

Operation S103 is an operation of converting the acquired one-dimensional EMG signal to a 2D EMG spectrogram image including a temporal feature and a frequency feature.

In one embodiment, the one-dimensional EMG signal may be divided into repetitive cycles for one motion of the user, the divided one-dimensional EMG signal may be separated for each of at least one muscle used for one motion of the user, and the one-dimensional EMG signal separated for each of the at least one muscle may be combined in a time domain. Here, the time domain may include a time axis.

In one embodiment, the one-dimensional EMG signal combined in the time domain may be converted to the 2D EMG spectrogram image.

In one embodiment, a Fourier transform may be applied to the one-dimensional EMG signal combined in the time domain to convert the one-dimensional EMG signal to the 2D EMG spectrogram image. For example, the Fourier transform may include a short time Fourier transform (STFT), but is not limited thereto.

Further, a window length of the Fourier transform may be adjusted to generate the 2D EMG spectrogram image corresponding to the window length.

Operation S105 is an operation of recognizing the user based on the 2D EMG spectrogram image.

In one embodiment, the 2D EMG spectrogram image corresponding to the window length may be applied to a deep learning network to recognize the user. For example, the deep learning network may include convolutional neural networks (CNNs), but is not limited thereto.

Figure 2A:
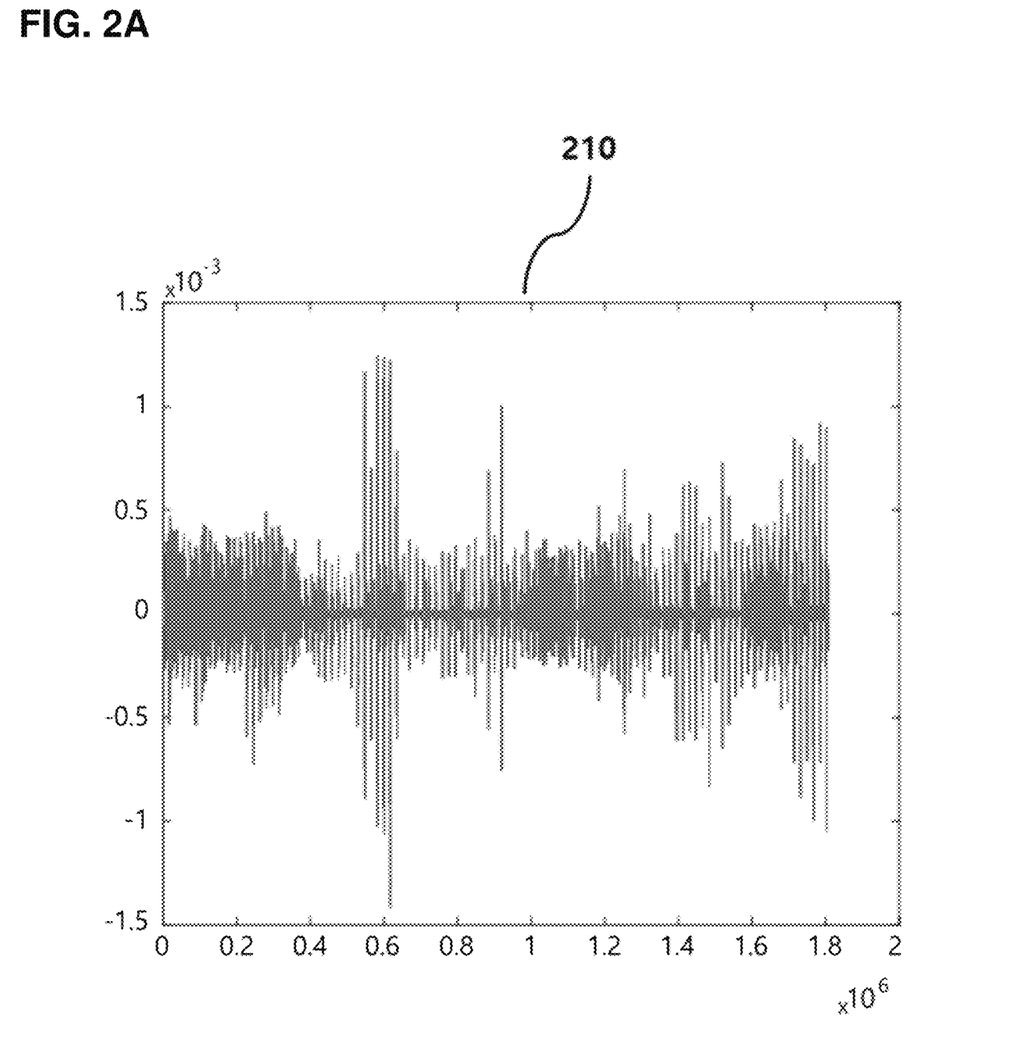
FIGS. 2A to 2C are views illustrating the combining of a one-dimensional EMG signal according to one embodiment of the present disclosure.
Figure 2B:
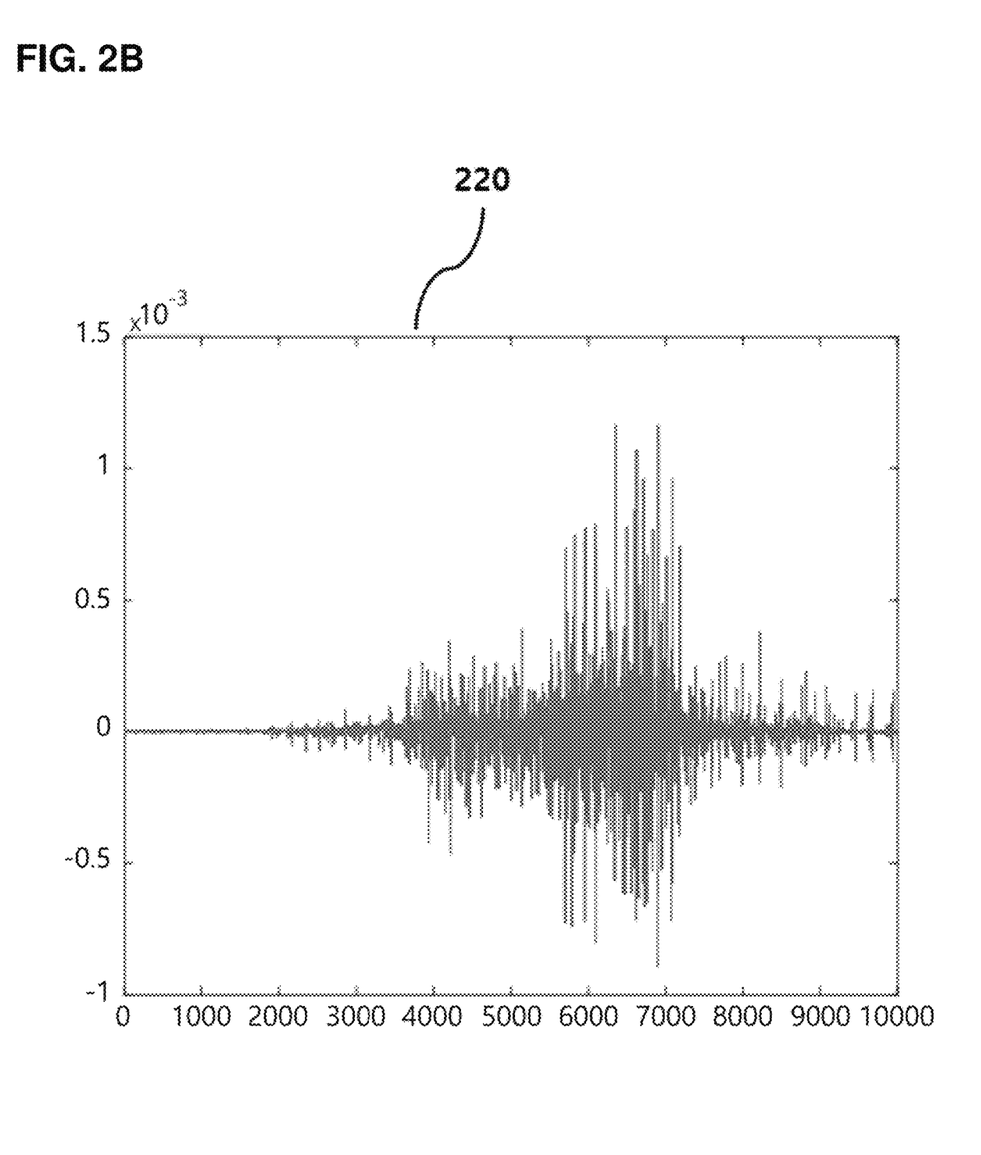
Figure 2C:
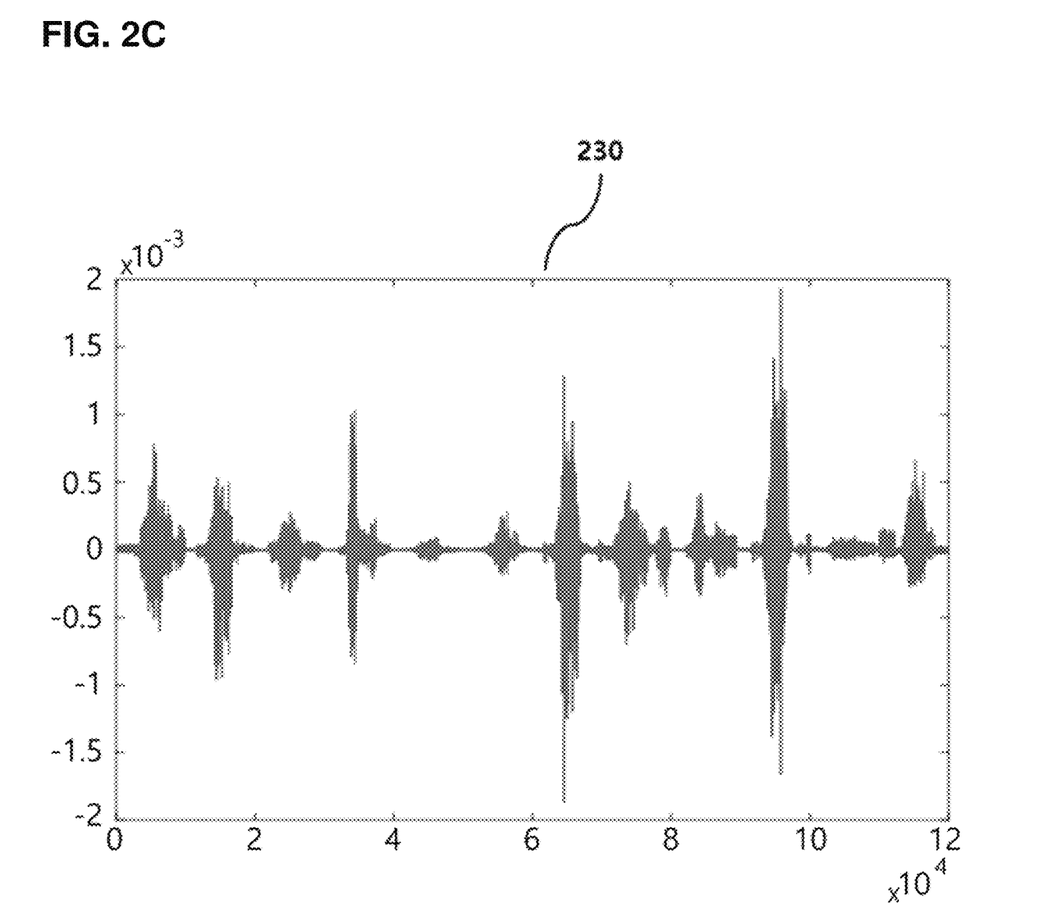

FIGS. 2A to 2C are views illustrating the combining of the one-dimensional EMG signal according to one embodiment of the present disclosure.

Referring to FIGS. 2A to 2C, in one cycle of the EMG signal, since different signal patterns occur depending on a muscle used as a signal generated when a corresponding motion is performed, and each user has a different degree of muscle development and activity, the unique biometric information of an individual is included.

Accordingly, in one embodiment, a one-dimensional EMG signal 210 may be divided into repetitive cycles for one motion of the user. Here, the repetitive cycles may include a cycle in which the user performs one motion once. That is, when the one-dimensional EMG signal 210 includes a one-dimensional EMG signal when one motion of the user is repeated multiple times, the one-dimensional EMG signal 210 may be divided into a cycle of performing one motion once.

Further, in one embodiment, the divided one-dimensional EMG signal 220 may be separated for each of at least one muscle used for one motion of the user.

That is, since the one-dimensional EMG signal 220 divided into repetitive cycles includes an EMG signal corresponding to each of the at least one muscle, the one-dimensional EMG signal 220 may be separated for each of the at least one muscle.

Further, in one embodiment, the one-dimensional EMG signal separated for each of the at least one muscle may be combined in the time domain. In one embodiment, each of the one-dimensional EMG signals separated for each of the at least one muscle may be sequentially arranged in the time domain.

Further, a one-dimensional EMG signal 230 combined in the time domain may be converted to the 2D EMG spectrogram image. Details thereof will be described in detail with in FIGS. 3 and 4 below.

That is, according to the present disclosure, the one-dimensional EMG signal may be divided into one EMG cycle, and the divided one-dimensional EMG signal may combine all signals of the channels in the time domain to use all the information of each muscle.

Figure 3:
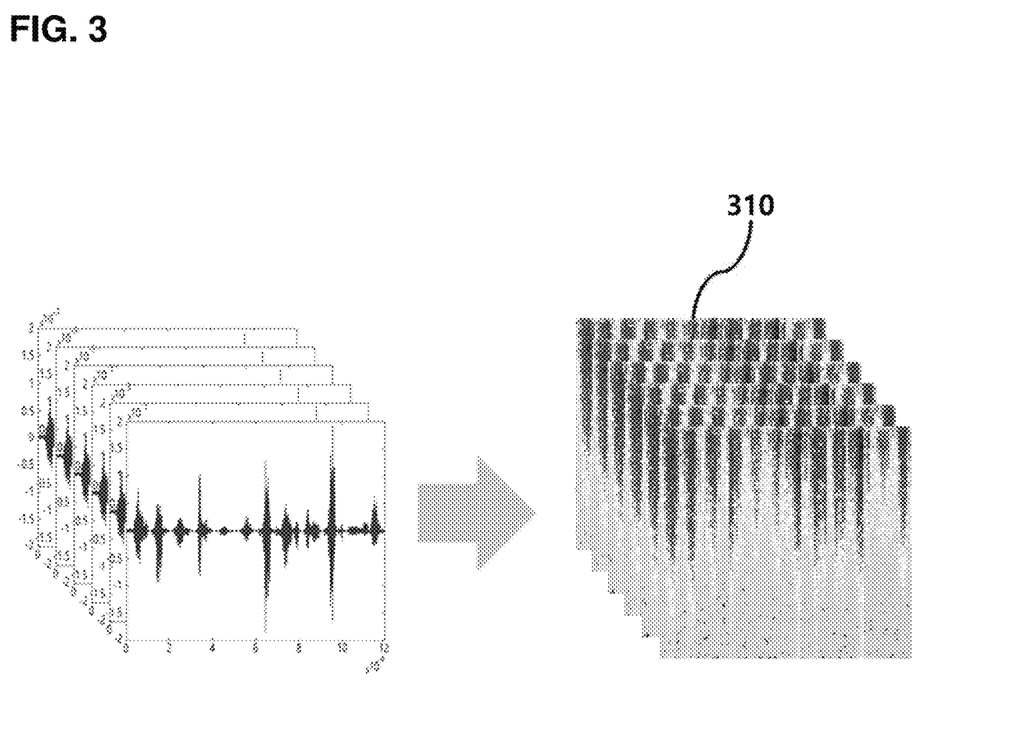
FIG. 3 is a view illustrating the conversion of the 2D EMG spectrogram image according to one embodiment of the present disclosure.
Figure 4:
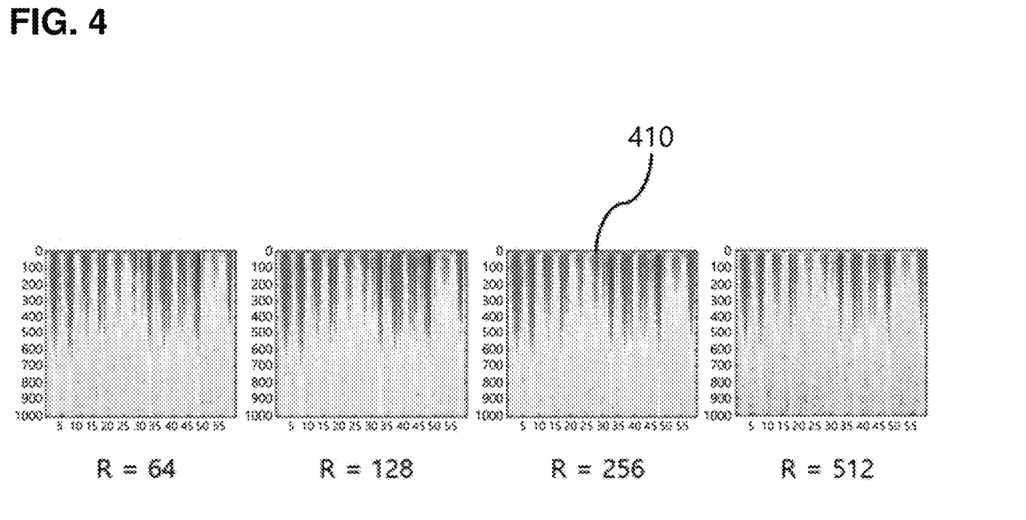
FIG. 4 is a view illustrating the 2D EMG spectrogram image in which a window length of a Fourier transform according to one embodiment of the present disclosure is adjusted.

FIG. 3 is a view illustrating the conversion of a 2D EMG spectrogram image 310 according to one embodiment of the present disclosure. FIG. 4 is a view illustrating the 2D EMG spectrogram image in which the window length of the Fourier transform according to one embodiment of the present disclosure is adjusted.

Referring to FIG. 3, the one-dimensional EMG signal 230 combined in the time domain may be converted to the 2D EMG spectrogram image 310.

In one embodiment, STFT conversion may be applied to the one-dimensional EMG signal 230 combined in the time domain to convert the one-dimensional EMG signal 230 to the 2D EMG spectrogram image 310.

For example, an STFT conversion equation may be expressed as in Equation 1 below.

$$X(R,\omega)=\int_{-\infty}^{\infty}x(t)w(t-R)e^{-i\omega t}dt=s$$ [Equation 1]

Here, x(t) represents an input signal, w(t) represents a window function, R represents a window length, w represents each frequency, and s represents a spectrogram value.

Referring to FIG. 4, a 2D EMG spectrogram image 410 corresponding to the window length may be generated by adjusting the window length R of the STFT. That is, a parameter which emphasizes the temporal feature and the frequency feature may be calculated by adjusting the window length of the STFT.

Figure 5:
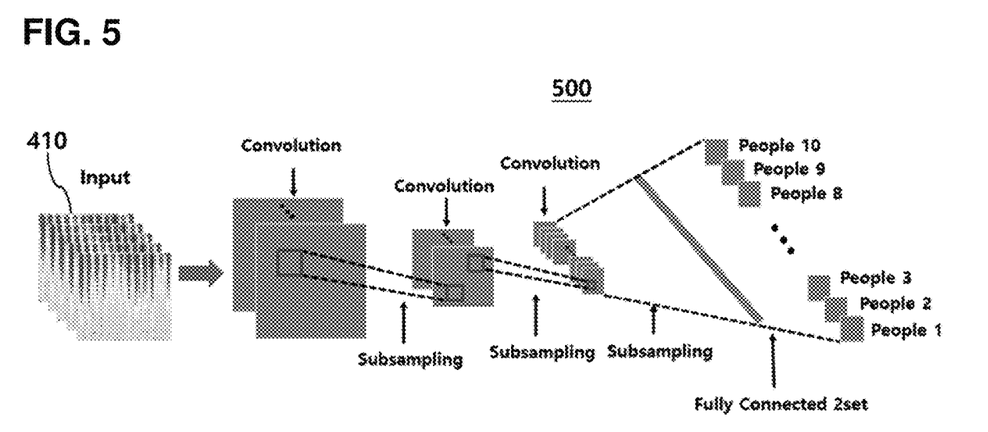
FIG. 5 is a view illustrating a deep learning network according to one embodiment of the present disclosure.

FIG. 5 is a view illustrating a deep learning network according to one embodiment of the present disclosure.

Referring to FIG. 5, the 2D EMG spectrogram image 410 corresponding to each window length may be used as an input of a CNN network 500. Accordingly, a recognition result of the user may be calculated as a result value of the CNN network 500.

For example, a user recognition result using the 2D EMG spectrogram image 410 according to each window length may be represented as shown in Table 1 below.

TABLE 1

| Number of subjects | Window length | | | |
|---|---|---|---|---|
| | 64 | 128 | 256 | 512 |
| Ten | 96% | 96.4% | 96.4% | 95.4% |
| Twenty | 95% | 95.9% | 96.2% | 94.2% |
| Thirty | 94% | 95.7% | 95.9% | 95.3% |
| Forty | 93.8% | 94.8% | 95.4% | 93% |

That is, referring to Table 1, it can be confirmed that user recognition performance changes according to a spectrogram parameter and the user recognition performance is the maximum when the window length is 256.

Further, after calculating an optimal window length, the user may be recognized by applying the 2D EMG spectrogram image corresponding to the window length to the CNN network 500.

Figure 6:
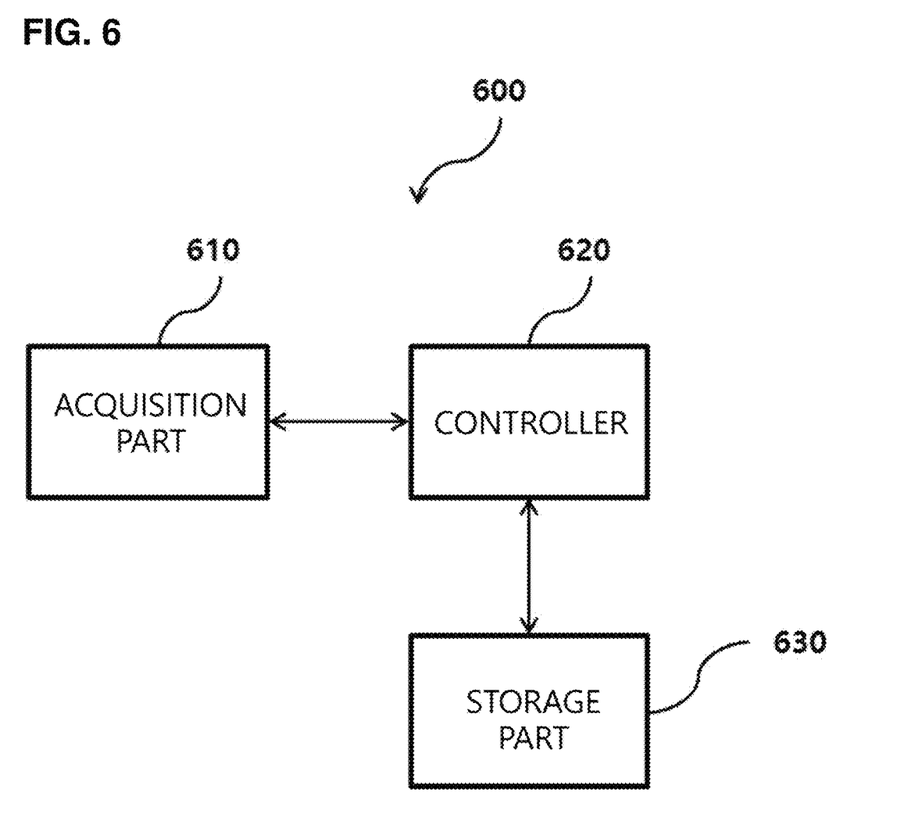
FIG. 6 is a view illustrating a user recognition apparatus using the 2D EMG spectrogram image according to one embodiment of the present disclosure.

FIG. 6 is a view illustrating a functional configuration of a user recognition apparatus 600 using the 2D EMG spectrogram image according to one embodiment of the present disclosure.

Referring to FIG. 6, the user recognition apparatus 600 using the 2D EMG spectrogram image may include an acquisition part 610, a controller 620, and a storage part 630.

The acquisition part 610 may acquire a one-dimensional EMG signal for a user. In one embodiment, the acquisition part 610 may include an EMG signal sensor module. In one embodiment, the acquisition part 610 may include at least one of a wired communication module and a wireless communication module. All or a part of the acquisition part 610 may be referred to as a 'transmitting part', a 'receiving part', or a 'transceiver'.

The controller 620 may convert the one-dimensional EMG signal to a 2D EMG spectrogram image including a temporal feature and a frequency feature. Also, the controller 620 may recognize the user based on the 2D EMG spectrogram image.

In one embodiment, the controller 620 may include at least one processor or microprocessor, or may be a part of the processor. Further, the controller 620 may be referred to as a communication processor (CP). The controller 620 may control the operation of the user recognition apparatus 600 using the 2D EMG spectrogram image according to various embodiments of the present disclosure.

The storage part 630 may store at least one of the one-dimensional EMG signal and the 2D EMG spectrogram image. In one embodiment, the storage part 630 may store a deep learning network.

In one embodiment, the storage part 630 may be composed of a volatile memory, a non-volatile memory, or a combination of a volatile memory and a non-volatile memory. Further, the storage part 630 may provide stored data according to the request of the controller 620.

Referring to FIG. 6, the user recognition apparatus 600 using the 2D EMG spectrogram image may include the acquisition part 610, the controller 620, and the storage part 630. In various embodiments of the present disclosure, since the components described in FIG. 6 are not essential to the user recognition apparatus 600 using 2D EMG spectrogram image, the user recognition apparatus 600 using the 2D EMG spectrogram image may be implemented with more or fewer configurations than those described in FIG. 6.

According to one embodiment of the present disclosure, a user can be recognized more accurately using a 2D EMG spectrogram image which emphasizes a temporal feature and a frequency feature while applying a short time Fourier transform (STFT), which can analyze frequency components over time, and changing parameters.

Effects of the present disclosure are not limited to the above-described effects, and potential effects expected by the technical features of the present disclosure may be apparently understood from the above description.

The above description is only an exemplary description of the technical spirit of the present disclosure, and various modifications and changes may be made by those skilled in the art without departing from the essential characteristics of the present disclosure.

Accordingly, the embodiments disclosed in the specification are provided not to limit the technical spirit of the present disclosure, but to describe the technical spirit of the present disclosure, and the scope of the present disclosure is not limited by these embodiments.

The protection scope of the present disclosure should be construed by the claims, and all technical spirit within the scope the same as the claims should be understood to be included in the scope of the present disclosure.

What is claimed is:

1. A user recognition method using a two-dimensional (2D) electromyogram (EMG) spectrogram image, comprising:
    (a) acquiring a one-dimensional EMG signal for a user;
    (b) converting the acquired one-dimensional EMG signal to a 2D EMG spectrogram image including a temporal feature and a frequency feature; and
    (c) recognizing the user based on the 2D EMG spectrogram,
    wherein the operation (b) includes: dividing the one-dimensional EMG signal into repetitive cycles for one motion of the user; separating the divided one-dimensional EMG signal for each of at least one muscle used for one motion of the user; and combining the one-dimensional EMG signal separated for each of the at least one muscle in a time domain.

2. The method of claim 1, wherein the operation (b) includes converting the one-dimensional EMG signal combined in the time domain to the 2D EMG spectrogram image.

3. The method of claim 2, wherein the converting operation includes: applying a Fourier transform to the one-dimensional EMG signal combined in the time domain to convert the one-dimensional EMG signal to the 2D EMG spectrogram image; and adjusting a window length of the Fourier transform to generate the 2D EMG spectrogram image corresponding to the window length.

4. The method of claim 3, wherein the operation (c) includes applying the 2D EMG spectrogram image corresponding to the window length to a deep learning network to recognize the user.

5. A user recognition apparatus using a 2D EMG spectrogram image, comprising:
   an acquisition part configured to acquire a one-dimensional EMG signal for a user; and
   a controller configured to convert the acquired one-dimensional EMG signal to a 2D EMG spectrogram image including a temporal feature and a frequency feature, and recognize the user based on the 2D EMG spectrogram image,
   wherein the controller divides the one-dimensional EMG signal into repetitive cycles for one motion of the user, separates the divided one-dimensional EMG signal for each of at least one muscle used for one motion of the user, and combines the one-dimensional EMG signal separated for each of the at least one muscle in a time domain.

6. The apparatus of claim 5, wherein the controller converts the one-dimensional EMG signal combined in the time domain to the 2D EMG spectrogram image.

7. The apparatus of claim 6, wherein the controller applies a Fourier transform to the one-dimensional EMG signal combined in the time domain to convert the one-dimensional EMG signal to the 2D EMG spectrogram image, and adjust a window length of the Fourier transform to generate the 2D EMG spectrogram image corresponding to the window length.

8. The apparatus of claim 7, wherein the controller applies the 2D EMG spectrogram image corresponding to the window length to a deep learning network to recognize the use.

* * * * *